US012692896B2

(12) United States Patent
Hanratty

(10) Patent No.: US 12,692,896 B2
(45) Date of Patent: Jul. 28, 2026

(54) BLIND RIVET ELEMENT

(71) Applicant: BBA S.r.l., Centobuchi di Monteprandone (IT)

(72) Inventor: Paul Hanratty, Southampton (GB)

(73) Assignee: BBA S.r.l., Centobuchi di Monteprandone (AP) (IT)

( * ) Notice: Subject to any disclaimer, the term of this patent is extended or adjusted under 35 U.S.C. 154(b) by 414 days.

(21) Appl. No.: 17/346,389

(22) Filed: Jun. 14, 2021

(65) Prior Publication Data

US 2021/0388861 A1     Dec. 16, 2021

(30) Foreign Application Priority Data

Jun. 15, 2020   (EP) ..................................... 20179931

(51) Int. Cl.
*F16B 37/06* (2006.01)

(52) U.S. Cl.
CPC .................................. *F16B 37/067* (2013.01)

(58) Field of Classification Search
CPC .... F16B 37/067; F16B 37/065; F16B 13/061; F16B 19/1072; F16B 2015/0046; F16B 2015/0069; F16B 15/0046; F16B 15/0038; F16B 39/282
USPC ............ 411/187–188, 160, 163–166, 38, 55, 411/466–468
See application file for complete search history.

(56) References Cited

U.S. PATENT DOCUMENTS

| | | | | | |
|---|---|---|---|---|---|
| 1,740,113 | A | * | 12/1929 | Olson | ..................... F16B 39/24 |
| | | | | | 411/165 |
| 1,878,425 | A | * | 9/1932 | Olson | ..................... F16B 39/24 |
| | | | | | 411/957 |
| 1,882,089 | A | * | 10/1932 | Olson | ..................... F16B 39/26 |
| | | | | | 411/959 |
| 2,102,558 | A | * | 12/1937 | Johnson | ................ F16B 37/048 |
| | | | | | 411/968 |

(Continued)

FOREIGN PATENT DOCUMENTS

| | | |
|---|---|---|
| CN | 104 314 958 A | 1/2015 |
| EP | 0 077 858 A1 | 5/1983 |

(Continued)

OTHER PUBLICATIONS

Europäisches Patentamt (European Patent Office), Europäischer Recherchenbericht (European Research Report), Oct. 13, 2020, 2 pages, European Patent Office, München, Germany (DE).

*Primary Examiner* — Christine M Mills
*Assistant Examiner* — Dil K. Magar
(74) *Attorney, Agent, or Firm* — NK Patent Law

(57) ABSTRACT

A blind rivet element has a head portion and a shank adjacent to the head portion in an axial direction. The shank has an internal thread or a connecting portion for a threaded bolt and a deformation portion between the internal thread or the connecting portion for the threaded bolt and the head portion for forming a closing head when the deformation portion is deformed. The head portion has a radially outer region formed spaced apart from the shank in a radial direction. The head portion has at least one first protrusion protruding in the axial direction formed exclusively in the radially outer region of the head portion, and/or the head portion has at least one second protrusion protruding counter to the axial direction formed exclusively in the radially outer region of the head portion.

18 Claims, 6 Drawing Sheets

(56)  References Cited

U.S. PATENT DOCUMENTS

| | | | | | |
|---|---|---|---|---|---|
| 2,241,657 | A | * | 5/1941 | Dehring | F16B 2/005 |
| | | | | | 248/235 |
| 3,175,462 | A | * | 3/1965 | Disley | F16B 29/00 |
| | | | | | 411/968 |
| 3,316,796 | A | * | 5/1967 | Young | F16B 13/002 |
| | | | | | 411/29 |
| 3,385,156 | A | * | 5/1968 | Polos | F16B 13/002 |
| | | | | | 411/37 |
| 3,910,331 | A | * | 10/1975 | Randall | F16B 37/062 |
| | | | | | 411/181 |
| 4,269,106 | A | * | 5/1981 | Leibhard | F16B 13/061 |
| | | | | | 411/34 |
| 4,434,736 | A | * | 3/1984 | Szostak | D05B 75/06 |
| | | | | | 403/41 |
| 5,269,208 | A | * | 12/1993 | Kolvites | B25B 13/485 |
| | | | | | 411/407 |
| 6,220,804 | B1 | * | 4/2001 | Pamer | F16B 37/068 |
| | | | | | 411/188 |
| 6,416,269 | B1 | * | 7/2002 | Martel | E04F 15/02 |
| | | | | | 52/480 |
| 6,893,196 | B2 | * | 5/2005 | Wille | F16B 19/1072 |
| | | | | | 411/969 |
| 7,066,700 | B2 | * | 6/2006 | Ward | B21K 1/702 |
| | | | | | 411/188 |
| 7,226,263 | B2 | * | 6/2007 | Schwarzbich | F16B 5/0233 |
| | | | | | 411/546 |
| 7,597,516 | B2 | * | 10/2009 | Bucciferro | F16B 35/047 |
| | | | | | 411/162 |
| 7,901,171 | B2 | * | 3/2011 | Schruff | F16B 37/067 |
| | | | | | 411/38 |
| 8,936,422 | B2 | * | 1/2015 | Makino | F16B 37/067 |
| | | | | | 411/34 |
| 8,961,087 | B2 | * | 2/2015 | Schruff | F16B 37/065 |
| | | | | | 411/183 |
| D843,825 | S | * | 3/2019 | Wang | D8/387 |
| 11,181,139 | B2 | * | 11/2021 | Hellmig | F16B 39/282 |
| 2003/0002951 | A1 | | 1/2003 | Wakai | |
| 2004/0141826 | A1 | * | 7/2004 | Babej | F16B 37/065 |
| | | | | | 411/181 |
| 2005/0013677 | A1 | * | 1/2005 | Anquetin | F16B 13/061 |
| | | | | | 411/38 |
| 2006/0251489 | A1 | * | 11/2006 | Denham | F16B 37/068 |
| | | | | | 411/34 |
| 2006/0257229 | A1 | * | 11/2006 | Bucciferro | F16B 35/065 |
| | | | | | 411/187 |
| 2006/0291974 | A1 | * | 12/2006 | McGee | B25B 27/0014 |
| | | | | | 411/171 |
| 2007/0264099 | A1 | * | 11/2007 | Huang | F16B 13/061 |
| | | | | | 411/38 |
| 2007/0269277 | A1 | * | 11/2007 | Villanueva | B25B 27/0014 |
| | | | | | 407/113 |
| 2008/0066287 | A1 | * | 3/2008 | Babej | B23P 19/062 |
| | | | | | 29/446 |
| 2008/0107499 | A1 | * | 5/2008 | Denham | F16B 37/067 |
| | | | | | 411/548 |
| 2008/0193256 | A1 | * | 8/2008 | Neri | F16B 37/067 |
| | | | | | 411/437 |
| 2010/0101177 | A1 | * | 4/2010 | McGee | F16B 19/1072 |
| | | | | | 52/698 |
| 2012/0195707 | A1 | * | 8/2012 | Villatte | F16B 13/122 |
| | | | | | 411/33 |
| 2012/0243960 | A1 | * | 9/2012 | Ivinson | F16B 37/067 |
| | | | | | 411/427 |
| 2013/0011217 | A1 | * | 1/2013 | Avellon | F16B 19/06 |
| | | | | | 72/356 |
| 2013/0129442 | A1 | * | 5/2013 | Schruff | F16B 19/1036 |
| | | | | | 411/43 |
| 2013/0209193 | A1 | * | 8/2013 | Doye | F16B 39/02 |
| | | | | | 411/166 |
| 2014/0021236 | A1 | * | 1/2014 | Martel | F16B 15/02 |
| | | | | | 227/18 |
| 2015/0139747 | A1 | * | 5/2015 | Hsu | B21D 51/36 |
| | | | | | 411/43 |
| 2015/0275951 | A1 | * | 10/2015 | Shadwell | F16B 43/00 |
| | | | | | 411/511 |
| 2016/0010679 | A1 | * | 1/2016 | Makino | F16B 37/067 |
| | | | | | 411/34 |
| 2018/0100529 | A1 | * | 4/2018 | Humpert | F16B 19/10 |
| 2018/0238374 | A1 | * | 8/2018 | Gris | B23P 15/00 |

FOREIGN PATENT DOCUMENTS

| | | | | | |
|---|---|---|---|---|---|
| EP | 0 158 304 | A1 | 10/1985 | | |
| EP | 1 277 970 | A1 | 1/2003 | | |
| EP | 1 625 309 | A1 | 2/2006 | | |
| EP | 2 308 612 | A1 | 4/2011 | | |
| GB | 2401661 | A | * | 11/2004 | F16B 29/00 |
| WO | WO-2004022260 | A1 | * | 3/2004 | B21J 15/025 |
| WO | WO-2004102015 | A1 | * | 11/2004 | F16B 29/00 |

* cited by examiner

BLIND RIVET ELEMENT

FIELD OF THE INVENTION

The present invention relates to a blind rivet element, in particular a blind rivet element for producing a screw connection in a component.

BACKGROUND OF THE INVENTION AND RELATED ART

Blind rivet elements have proven to be effective for fastening tasks in which a screw connection is required in the region of thin-walled materials, for example metal sheets, into which a thread cannot usually be cut. A blind rivet element is known, for example, from EP 1 918 596 A1.

A problem with such blind rivet elements or of a screw connection produced by means of such blind rivet elements is that the blind rivet elements or the screw connections do not have sufficient resistance to torsion, and therefore, during an intended tightening of the screw connection or during an intended release of the screw connection, the blind rivet element twists in relation to the component into which the blind rivet element has been introduced. This conceals the risk that the screw connection cannot be tightened sufficiently or that the screw connection cannot be released. In addition, the component or surrounding components may be damaged when the blind rivet element rotates.

OBJECT AND SUMMARY OF THE INVENTION

It is the object of the present invention to provide a blind rivet element which ensures particularly high resistance to torsion and is also suitable for penetrating a surface of the component to which the blind rivet element is connected, in particular for penetrating a coating applied to the component, for example a plastics coating or a layer of paint, in particular in order to produce an electrical contact between the blind rivet element and the component.

This object is achieved by a blind rivet element which has the features of the present invention. The blind rivet element according to the present invention has a head portion and a shank adjacent to the head portion in an axial direction. The head portion preferably has a larger diameter than the shank. The shank has an internal thread or a connecting portion for a threaded bolt and a deformation portion between the internal thread or the connecting portion for the threaded bolt and the head portion. The deformation portion serves for forming a closing head when the deformation portion is deformed. The head portion has a radially outer region, wherein the radially outer region is formed spaced apart from the shank in a radial direction. The head portion has at least one first protrusion protruding in the axial direction, wherein the at least one first protrusion is formed exclusively in the radially outer region of the head portion, and/or the head portion has at least one second protrusion protruding counter to the axial direction, wherein the at least one second protrusion is formed exclusively in the radially outer region of the head portion.

The formation of the first protrusion and/or of the second protrusion in the radially outer region has the advantage that torsional forces acting on the blind rivet element can be introduced particularly readily from the blind rivet element into the component contacted by the protrusions, and therefore the blind rivet element has particularly high resistance to torsion.

Furthermore a formation of the protrusions in the radially outer region has proven to be an advantage in that tolerances of the through opening, into which the blind rivet element is introduced and subsequently set, and tolerances in the setting of the blind rivet element have only a small influence on the correct penetration of the protrusions into the respective component since the protrusions are arranged spaced apart sufficiently from the setting hole/the through opening. In contrast thereto, in the case of protrusions in the radially inner region, there is the risk of said protrusions partially not penetrating into the corresponding component, but rather, after the setting of the blind rivet element, the protrusions are at least partially arranged in the through opening/the setting hole and thus cannot contribute or can only slightly contribute to the resistance of the blind rivet element to torsion. Furthermore, in the case of protrusions in the radially inner region, there is an increased risk of the blind rivet element tilting when the blind rivet element is introduced in the setting hole, and therefore the axial direction of the blind rivet element and the axial direction of the setting hole are tilted with respect to each other, which has a disadvantageous effect on the screw connection which is formed by means of the blind rivet element and in this case does not have the desired angular orientation.

In particular, when there are protrusions protruding counter to the axial direction, thus protrusions which are formed on that side of the head portion which faces away from the shank, the formation of said protrusions in the radially outer region has the advantage that the protrusions are arranged outside a region which is typically contacted by the setting tool used for setting the blind rivet element. Obstruction of the setting of the blind rivet element is thus avoided. An inadvertent deformation of the protrusions during the setting operation is also avoided.

The blind rivet element can be designed as a blind rivet nut insofar as the blind rivet element is formed with an internal thread in the region of the shank. A fastening element which has a blind rivet element in the form of a blind rivet nut, insofar as it has a blind rivet element with an internal thread, can be connected to a component in such a manner that the fastening means is first of all placed into a pre-manufactured hole or into a pre-manufactured receiving opening in the component and is then riveted with a suitable tool which typically has a rotatable and axially displaceable threaded mandrel. For this purpose, the threaded mandrel is screwed into the internal thread of the blind rivet nut from the head portion side and is then displaced axially in such a manner that the deformation portion is compressed and thus forms a counter flange, i.e. a closing head, between the start of the thread and the lower side of the component. The closing head together with the head portion of the blind rivet nut, which head portion is arranged on the upper side of the component, anchors the blind rivet nut and thus the fastening means in the component. The threaded mandrel is subsequently unscrewed. The blind rivet nut is then available as a receptacle for a fastening screw. If the blind rivet element is designed as a blind rivet threaded bolt, the shank has a receptacle for a threaded bolt which is generally welded or pressed to the receptacle. The fastening means is connected to a blind rivet threaded bolt in a manner corresponding to the connection of the fastening means to the blind rivet nut, with the difference that the threaded bolt is directly pulled.

The at least one first protrusion and/or the at least one second protrusion assists the formation of an electrical contact between the blind rivet element and the component contacted by the respective protrusion since the corresponding protrusion is particularly readily suitable for penetrating a coating, for example a plastics coating or a layer of paint which is applied to an electrically conductive material of the component, and thus for directly contacting the electrically conductive material of the component.

The blind rivet element preferably comprises an electrically conductive material or is composed of an electrically conductive material, for example a metal or a metal alloy.

It is entirely possible for the at least one first protrusion and/or the at least one second protrusion to be designed as an encircling protrusion.

The blind rivet element preferably has a plurality of first protrusions and/or a plurality of second protrusions.

The plurality of first protrusions and/or the plurality of second protrusions are arranged spaced apart in particular tangentially and/or preferably in an encircling manner. It is considered to be particularly advantageous here if the plurality of first protrusions and/or the plurality of second protrusions are arranged in a rotationally symmetrical manner, with the cardinal number being greater than 1. It is considered to be particularly advantageous in this connection if the cardinal number is identical to the number of first protrusions or the number of second protrusions.

The plurality of first protrusions and/or plurality of second protrusions are preferably arranged along a circular ring.

In a particularly preferred embodiment, a radially inner region of the head portion is free from protrusions.

With regard to a particularly high resistance to torsion, it has proven advantageous if a radial distance between the respective first or second protrusion and the shank is at least 50% of a radial distance between an outer edge of the head portion and the shank. The aforementioned ratio is preferably at least 60%, in particular at least 75%.

It is considered to be particularly advantageous if the at least one first protrusion and/or the at least one second protrusion are/is formed on the outer edge of the head portion.

In a preferred embodiment, the blind rivet element is designed in such a manner that in a projection in the axial direction, the head portion has a recess adjacent to the at least one first protrusion and/or has a recess adjacent to the at least one second protrusion. A clearance is thus formed tangentially adjacent to the first protrusion and/or the second protrusion. Such a configuration has proven advantageous with regard to a particularly high resistance to torsion. This clearance can serve in particular for receiving material of the component, into which the blind rivet element is introduced, or of the component, which, during the connection of the components, comes into contact with the head portion on the side which faces away from the shank, the material being displaced during the setting of the blind rivet element because of the penetration of the first protrusion. This enables the respective protrusion to penetrate deeper into the respective component. Since the clearance is also filled by displaced material, the resistance to torsion is additionally increased.

In conjunction with the recess, it is considered to be advantageous if the respective recess is adjacent in the clockwise direction to the at least one first protrusion in a viewing direction in the axial direction, and/or the respective recess is adjacent in the clockwise direction to the at least one second protrusion in a viewing direction in the axial direction.

This symmetrical configuration has proven particularly advantageous with regard to the resistance to torsion.

Furthermore, it is considered to be advantageous if the head portion is free from a recess adjacent anticlockwise to the at least one first protrusion in a viewing direction in the axial direction, and/or the head portion is free from a recess adjacent anticlockwise to the at least one second protrusion in a viewing direction in the axial direction. In the case of such a configuration, the protrusion is particularly readily suitable for absorbing torsion forces since the protrusion can be supported in the tangential direction on the rest of the head portion, or the head portion can particularly readily absorb forces acting tangentially on the protrusion.

In a further embodiment of the blind rivet element, it is provided that the respective recess is adjacent anticlockwise to the at least one first protrusion in a viewing direction in the axial direction, and/or the respective recess is adjacent anticlockwise to the at least one second protrusion in a viewing direction in the axial direction. Reference is made to the statements above with regard to the advantages.

In this embodiment, it is considered to be particularly advantageous if the head portion is free from a recess adjacent in the clockwise direction to the at least one first protrusion in a viewing direction in the axial direction, and/or the head portion is free from a recess adjacent in the clockwise direction to the at least one second protrusion in a viewing direction in the axial direction. Reference is made to the above statements with regard to the advantages.

The at least one first protrusion and/or the at least one second protrusion are/is preferably formed by local deformation of a region of the head portion, for example by means of stamping or bending over a partial region of the head portion.

With regard to a particularly good and simple penetration of the first protrusion and/or of the second protrusion into the respective component, it has proven advantageous if the at least one first protrusion and/or the at least one second protrusion have/has a cutting edge and/or a point. The cutting edge or the point is preferably formed at the free end of the protrusion.

It has proven particularly advantageous if the cutting edge extends substantially in the radial direction. Substantially is understood here as meaning that the cutting edge is oriented at an angle of between 0° and 10° to the radial direction.

In an advantageous development, it is provided that the at least one first protrusion and/or the at least one second protrusion have/has a first cutting face and a second cutting face which is inclined with respect to the first cutting face, wherein a contact line of the cutting faces forms the cutting edge of the respective protrusion. An angle which is enclosed by the cutting faces is preferably between 80° and 120°.

The blind rivet element is preferably formed integrally.

The blind rivet element is preferably composed of a metal or a metal alloy.

It has proven particularly advantageous if the first cutting face encloses a first angle with a plane formed perpendicularly to the axial direction and the second cutting face encloses a second angle with said plane, wherein the value of the second angle is smaller than the value of the first angle. The first angle and/or the second angle are/is preferably less than 90°. The second cutting face preferably faces the recess. When the screw connection formed by means of the blind rivet element is tightened and when the screw connection formed by means of the blind rivet element is released, essentially faces having a different inclination are therefore loaded. The blind rivet element is formed asymmetrically in this respect. This asymmetric configuration has proven particularly advantageous. In the case of such a configuration, the maximum torques which can be absorbed by the blind rivet element when the screw connection is tightened and when the screw connection is released typically differ. As a result, for example, it can be ensured that a screw connection which is formed can also be released again by the blind rivet element being configured in such a manner that the maximum torque which can be absorbed by the blind rivet element when the screw connection is tightened is lower than the maximum torque which can be absorbed by the blind rivet element when the screw connection is released.

It is considered to be particularly advantageous if the blind rivet element has a plurality of first protrusions and/or a plurality of second protrusions, wherein an entirety of the plurality of first protrusions and/or an entirety of the plurality of second protrusions are/is formed in an encircling manner about an axis formed in the axial direction, preferably the blind rivet element has a plurality of first protrusions and a plurality of second protrusions, wherein the plurality of first protrusions and the plurality of second protrusions are formed in an alternating manner in the encircling direction.

The blind rivet element preferably has at least three first protrusions and three second protrusions, preferably at least four first protrusions and at least four second protrusions.

It is considered to be particularly advantageous if the head portion has a greater extent in the axial direction in the region of the first protrusion and/or in the region of the second protrusion than in adjacent regions of the head portion. In this respect, the thickness of the head portion is increased in the region of the respective protrusion, thus avoiding that the head portion is deformed, in particular compressed, in the axial direction when the protrusions are loaded axially.

The head portion can have an oval, in particular a circular, cross section. However, the head portion can also have a polygonal, in particular a square or hexagonal, cross section. The head portion can have a semi-hexagonal or hexagonal cross section. The head portion can be designed to be thick or thin in the axial direction, in particular in its radially outer region. The head portion is preferably designed as a countersunk head.

The shank or at least part of the shank can have an oval, in particular circular, cross section. However, the shank or at least part of the shank can also have a polygonal, in particular a square or hexagonal, cross section. The shank or at least part of the shank can have in particular a semi-hexagonal or hexagonal cross section.

The shank and/or the head portion preferably have/has knurling, in particular the shank and/or the head portion have/has a knurling radially on the outside.

DESCRIPTION OF THE DRAWING FIGURES

The invention present will be explained in more detail in the figures below on the basis of exemplary embodiments without being restricted thereto.

6

Figure 6:
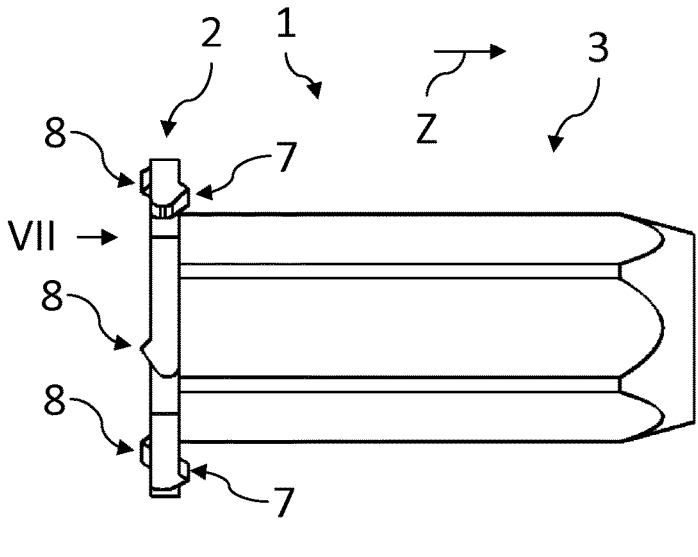
FIG. 6 shows a further embodiment of a blind rivet element of the present invention in a side view.
Figure 7:
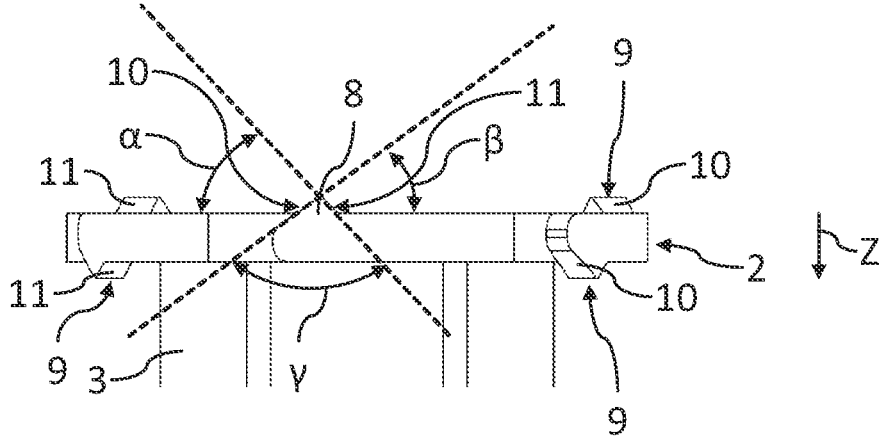

FIG. 7 shows a partial region of the blind rivet element according to FIG. 6.

Figure 8:
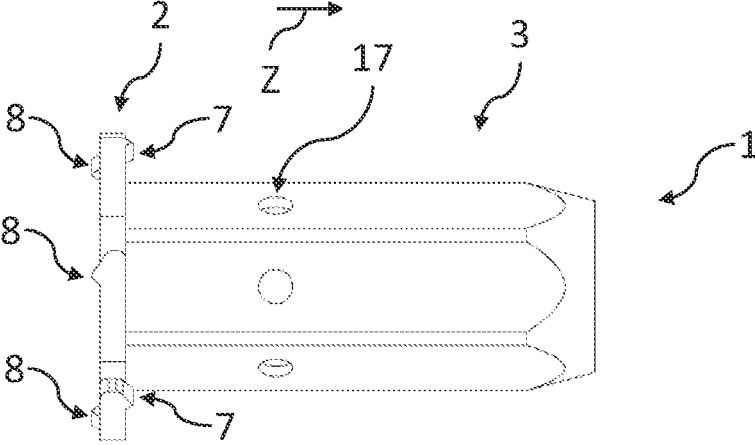

FIG. 8 shows a further embodiment of a blind rivet element of the present invention in a side view.

Figure 9:
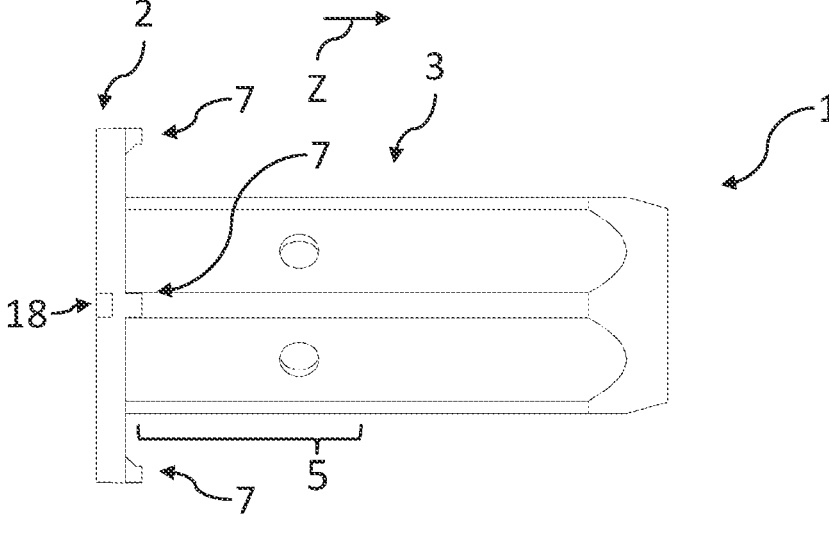

FIG. 9 shows a further embodiment of a blind rivet element of the present invention in a side view.

Figure 10:
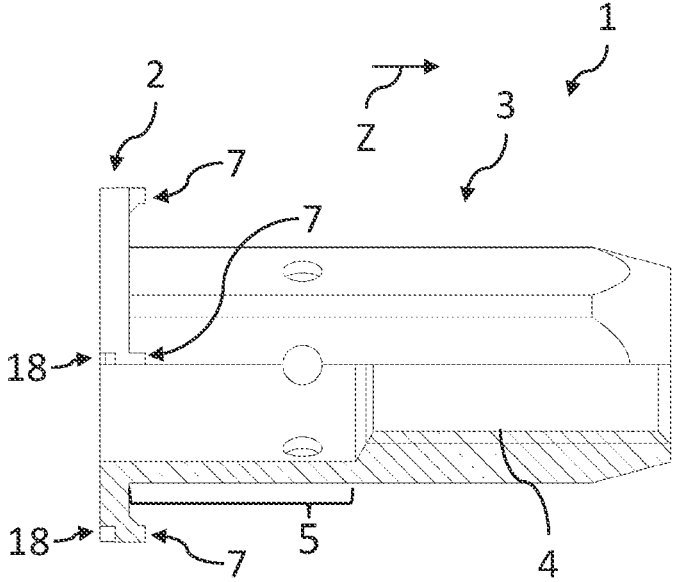

FIG. 10 shows the blind rivet element according to FIG. 9 in a partially sectioned illustration.

Figure 11:
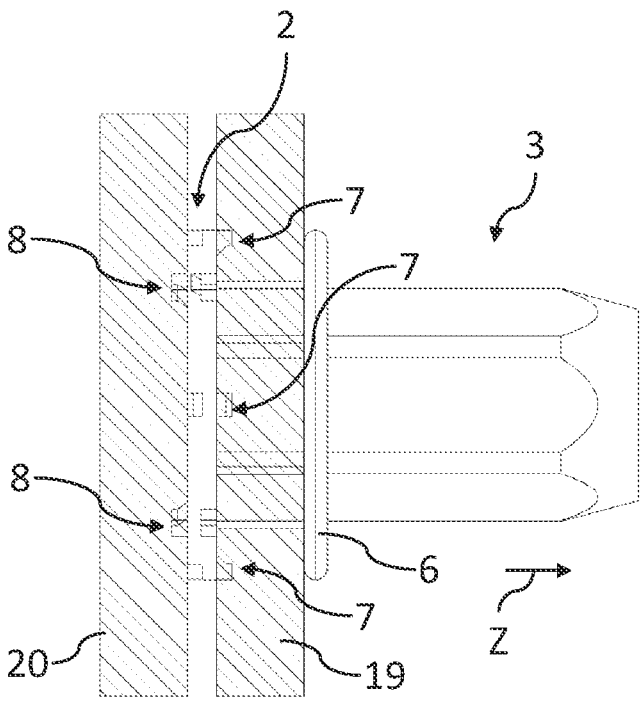

FIG. 11 shows a further embodiment of a blind rivet element of the present invention in a state after deformation of a deformation portion.

Figure 12:
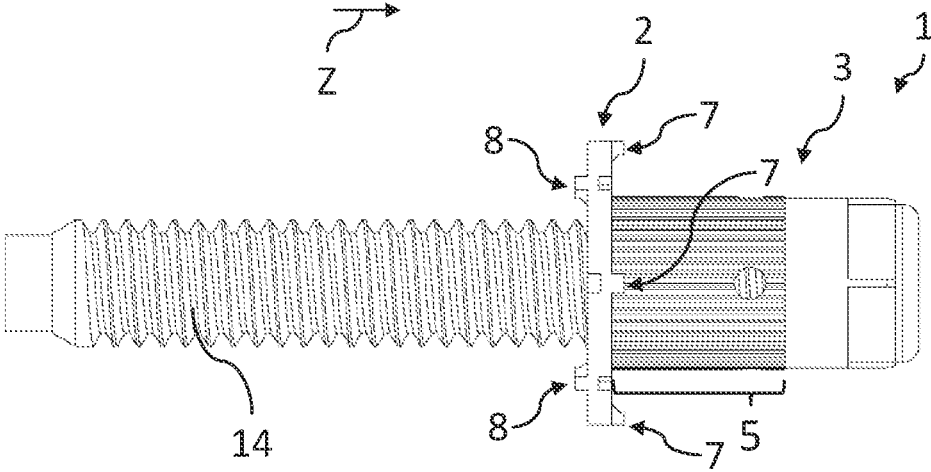

FIG. 12 shows a further embodiment of a blind rivet element of the present invention in a side view.

Figure 13:
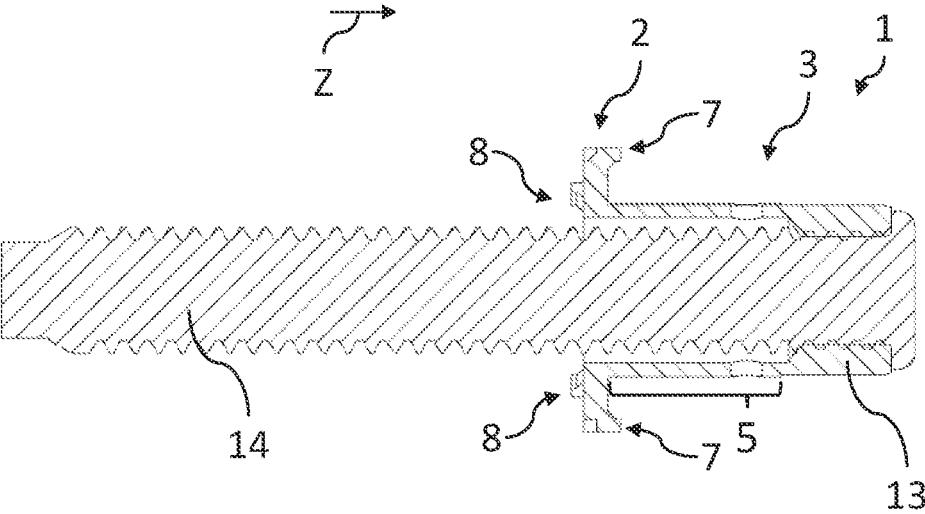

FIG. 13 shows the blind rivet element according to FIG. 12 in a sectional view.

DESCRIPTION OF EXEMPLARY EMBODIMENTS OF THE INVENTION

FIGS. 1 to 5 show a first embodiment of a blind rivet element 1 according to the present invention. The blind rivet element 1 has a head portion 2 and a shank 3 adjacent to the head portion 2 in an axial direction Z. The shank 3 is designed here as a partial hexagon, wherein the shank 3 at its end facing away from the head portion 2 has a cross section tapering in the axial direction Z. As a result, the insertion of the blind rivet element 1 with the shank 3 moving forward into a setting hole is facilitated.

The shank 3 has an internal thread 4 and a deformation portion 5 between the internal thread 4 and the head portion 2, wherein the deformation portion 5 is formed here by a material weakening, namely a smaller wall thickness of the shank 3 in the region of the deformation portion 5. This can be seen in particular from FIG. 3. The deformation portion 5 serves for forming a closing head 6 (see, FIG. 11) when the deformation portion 5 is deformed. The blind rivet element 1 is connected to a further component typically in such a manner that the blind rivet element 1 is first of all placed in a pre-manufactured hole or in a pre-manufactured receiving opening of the component and is then riveted in the component with a suitable tool by the blind rivet element 1 being deformed in the region of the deformation portion 5 in such a manner that the closing head 6 is formed on that side of the component which faces away from the head portion 2. The tool which is used typically has a rotatable and axially displaceable threaded mandrel. The threaded mandrel is screwed from the head portion side into the internal thread 4 of the blind rivet element 1, which is designed as a blind rivet nut, and is then displaced axially in such a manner that the deformation portion 5 is compressed and thus forms a counter flange in the form of the closing head 6 between the start of the internal thread 4 and the lower side of the component. The closing head 6 together with the head portion 2, which is arranged on the upper side of the component, anchors the blind rivet element 1 in the component. The threaded mandrel of the setting tool is subsequently unscrewed. The internal thread 4 of the blind rivet element 1 is then available as a receptacle for a fastening means, for example a screw.

The head portion 2 of the blind rivet element 1 has a radially outer region 15, wherein the radially outer region 15 is formed spaced apart in a radial direction from the shank 3. A radially inner region 16 of the head portion 2 is formed between the radially outer region 15 and the shank 3 of the blind rivet element 1. The radially outer region 15 and the radially inner region 16 are defined in FIG. 5 by a dotted line which delimits the radially inner region 16 from the radially outer region 15.

The head portion 2 has three first protrusions 7 protruding in the axial direction Z and three second protrusions 8 protruding counter to the axial direction Z, wherein the first protrusions 7 and the second protrusions 8 are formed exclusively in the radially outer region 15 of the head portion 2. The radially inner region 16 of the head portion 2, by contrast, is free from protrusions.

The first protrusions 7 and the second protrusions 8 are formed here on the outer edge of the head portion 2. A radial distance between the respective protrusion 7, 8 and the shank 3 is at least 60% of a radial distance between the outer edge of the head portion 2 and the shank 3.

The first and second protrusions 7, 8 are arranged in an encircling manner about an axis of the blind rivet element 1 that is formed in the axial direction Z, wherein the arrangement here is rotationally symmetrical, wherein a cardinal number n is identical to the number of the first or second protrusion 7, 8, and therefore the cardinal number here is n=3.

In a projection in the axial direction Z, the head portion 2 has a respective recess 12 adjacent to the respective first protrusion 7 and adjacent to the respective second protrusion 8. The respective recess 12 is adjacent anticlockwise to the respective first protrusion 7 or to the respective second protrusion 8. In the other direction, namely in the clockwise direction, the head portion 2 is free from a recess adjacent to the respective first protrusion 7 or adjacent to the respective second protrusion 8.

The respective recess 12 has the advantage that material which is displaced by means of the blind rivet element 1 when the blind rivet element 1 is introduced into a setting hole of the component and/or when a further component is screwed to said first component can be received in said recessed region. Owing to the head portion 2 being free from a recess in the other direction, the respective protrusion 7, 8 is supported in the tangential direction by the non-recessed part of the head portion 2.

Figure 2:
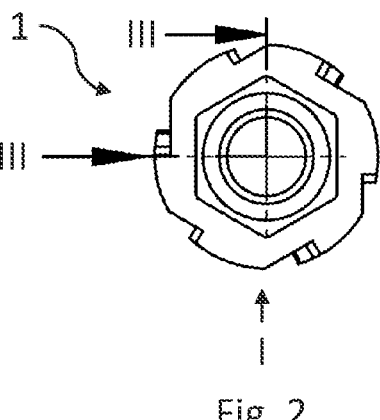
FIG. 2 shows the blind rivet element in a view according to the arrow II in FIG. 1.
Figure 5:
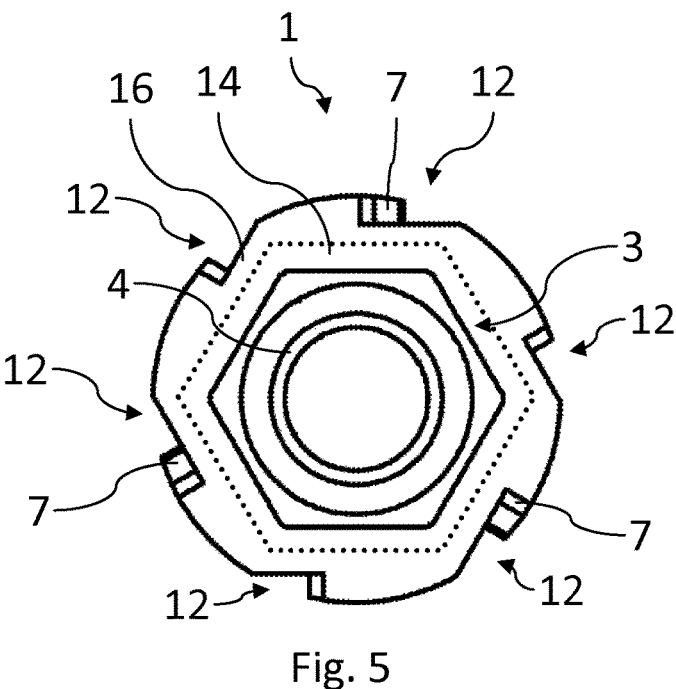
FIG. 5 shows the blind rivet element according to the arrow V in FIG. 3.

As can be seen in particular from FIGS. 2 and 5, this configuration of the head portion results in a saw-blade-like outer contour of the head portion 2 in a viewing direction in the axial direction Z.

The respective first protrusion 7 and the respective second protrusion 8 here have a protruding cutting edge 9, wherein the cutting edge 9 extends substantially in the radial direction. The cutting edge 9 of the respective protrusion 7, 8 is formed here by the respective protrusion 7, 8 having a first cutting face 10 and a second cutting face 11 which is inclined with respect to the first cutting face 10, wherein a contact line of the cutting faces 10, 11 forms the cutting edge 9 of the respective protrusion 7, 8 (see, FIG. 7).

As illustrated in FIG. 7, the first cutting face 10 encloses a first angle $\alpha$ with a plane formed perpendicularly to the axial direction Z and the second cutting face 11 encloses a second angle $\beta$ with said plane, wherein the value of the second angle $\beta$ is smaller than the value of the first angle $\alpha$. The second cutting face 11 faces the recess 12. The angle $\gamma$ enclosed by the cutting faces is preferably between 80° and 120°. By contrast, the angles $\alpha$ and $\beta$ are preferably both smaller than 90°.

The three first protrusions 7 and the three second protrusions 8 are formed here in an alternating manner in the encircling direction. Thus, a first protrusion 8 is followed in the encircling direction by a second protrusion 7 and the second protrusion 7 by a first protrusion 8.

The respective first protrusion 7 and the respective second protrusion 8 are formed here by local deformation of a region of the head portion 2, wherein, in order to form the respective protrusion 8, a partial region of the head portion 2 has been cut into here and then bent over.

Figure 1:
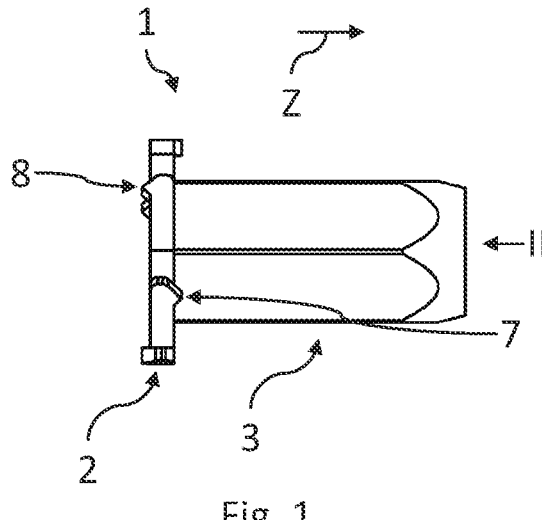
FIG. 1 shows a first embodiment of a blind rivet element of the present invention in a view according to the arrow I in FIG. 2.
Figure 3:
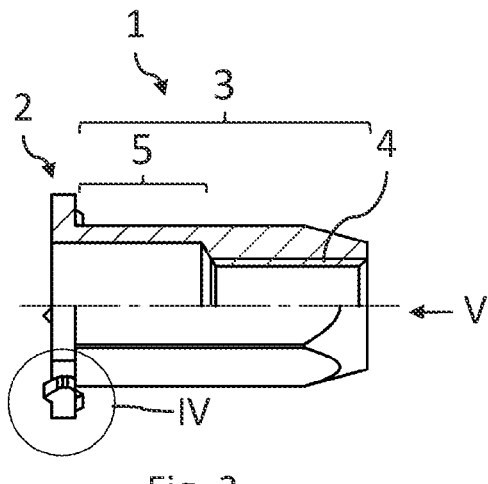
FIG. 3 shows the blind rivet element in a partially sectioned illustration according to the line III-III in FIG. 2.
Figure 4:
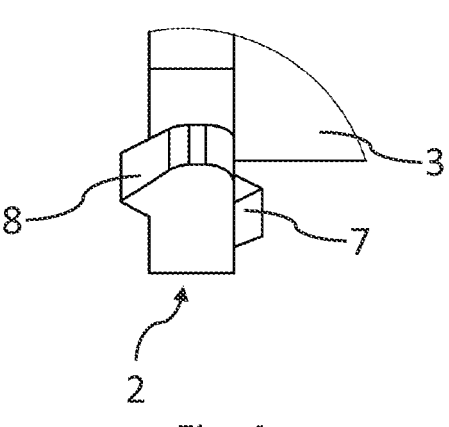
FIG. 4 shows a partial region of the blind rivet element according to the circle IV in FIG. 3.

As can be seen in particular from the views of FIG. 1, FIG. 3 and FIG. 4, the head portion 2 has a greater extent in the axial direction Z in the region of the respective first protrusion 7 and in the region of the respective second protrusion 8 than in adjacent regions of the head portion 2. In this respect, the respective protrusion 7, 8 is designed in such a manner that the head portion 2 has an increased material thickness in the respective region of the protrusion 7, 8. This has the advantage that, when the blind rivet element 1 is introduced into the component or when a further component is connected by means of the blind rivet element 1, that region of the head portion 2 which is opposite the respective protrusion 7, 8 in the axial direction Z or counter to the axial direction Z prevents deformation of the protrusion 7, 8 in the axial direction Z or counter to the axial direction Z, in particular the opposite region of the head portion 2 is supported on the respective other component and thereby prevents axial deformation of the respective protrusion 7, 8.

FIGS. 6 and 7 show a second embodiment of the blind rivet element 1, wherein said second embodiment differs from the first embodiment essentially by the length of the shank 3.

The third embodiment, which is shown in FIG. 8, differs from the second embodiment essentially in that the blind rivet element 1 in the deformation region 5 has holes 17 penetrating the shank 3 in the radial direction, wherein the holes 17 are arranged in an encircling manner, and wherein a flat face of the shank 3 designed as a partial hexagon in each case has a hole 17.

The fourth embodiment of the blind rivet element 1 that is illustrated in FIGS. 9 and 10 differs from the third embodiment of the blind rivet element 1 essentially by the configuration of the head portion 2. The fourth embodiment illustrated in FIGS. 9 and 10 merely has first protrusions 7 and no second protrusions 8. The first protrusions 7 are formed here by deformation of the head portion 2 in the axial direction Z, namely by a stamping operation. As a result, the head portion 2 in each case has a corresponding offset 18 opposite the first protrusion 7.

FIG. 11 shows a further embodiment of the blind rivet element 1 in a state placed into a first component 19, thus in a deformed state of the deformation portion 5, wherein, furthermore, a second component 20 is connected by means of a fastening means (not shown), here a screw which is screwed into the internal thread 4 of the blind rivet element 1. As can be seen from FIG. 11, the head portion 2 is arranged between the two components 19, 20, wherein, owing to the action of force during the setting of the blind rivet element 1 and during the tightening of the fastening means, the protrusions 7, 8 penetrate into the first component 19 or into the second component 20. This firstly achieves a particularly high resistance of the blind rivet element 1 to torsion and secondly a possible coating of the first component 19 or of the second component 20 is penetrated, for example in order to achieve an electrical connection between the blind rivet element 1 and the first component 19 or the second component 20 and in this way between the two components 19, 20. In the embodiment illustrated in FIG. 11, the protrusions 7, 8 are in turn formed by axial stamping.

The embodiment of the blind rivet element 1 which is illustrated in FIGS. 12 and 13 differs from the previous embodiments of the blind rivet element 1 essentially in that the shank 3 has a connecting portion 13 for a threaded bolt 14, wherein the threaded bolt 14 is connected here to the blind rivet element 1 in the region of the connecting portion 13. The deformation portion 5 is formed here between the connecting portion 13 for the threaded bolt 14 and the head portion 2.

The invention claimed is:

1. A blind rivet element having a head portion and a shank adjacent to the head portion in an axial direction, wherein the shank has an internal thread or a connecting portion for a threaded bolt, and a deformation portion between the internal thread or the connecting portion for the threaded bolt and the head portion for forming a closing head when the deformation portion is deformed, wherein the head portion has a radially outer region formed spaced apart from the shank in a radial direction, wherein the head portion has at least one first protrusion formed exclusively in the radially outer region of the head portion, and wherein the head portion has at least one second protrusion formed exclusively in the radially outer region of the head portion, wherein the blind rivet element has a plurality of first protrusions protruding in an axial direction from a first side of the head portion and a plurality of second protrusions protruding counter to the axial direction from a second side of the head portion opposite the first side, wherein the plurality of first protrusions and the plurality of second protrusions are formed on a respective side of the head portion in an encircling direction about an axis formed in the axial direction, and wherein the plurality of first protrusions and the plurality of second protrusions are formed in an alternating manner and separated by a recess on the respective side of the head portion in the encircling direction.

2. The blind rivet element according to claim 1, wherein a radial distance between the respective protrusion and the shank is at least 50% of a radial distance between an outer edge of the head portion and the shank.

3. The blind rivet element according to claim 2, wherein the at least one first protrusion and/or the at least one second protrusion are/is formed on the outer edge of the head portion.

4. The blind rivet element according to claim 1, wherein the at least one first protrusion and/or the at least one second protrusion are/is formed by local deformation of a region of the head portion.

5. The blind rivet element according to claim 1, wherein the at least one first protrusion and/or the at least one second protrusion have/has a protruding cutting edge and/or a protruding point.

6. The blind rivet element according to claim 5, wherein the cutting edge extends substantially in the radial direction.

7. The blind rivet element according to claim 5, wherein the at least one first protrusion and/or the at least one second protrusion have/has a first cutting face and a second cutting face which is inclined with respect to the first cutting face, wherein a contact line of at least one of the first cutting face and the second cutting face forms the cutting edge of the protrusion.

8. The blind rivet element according to claim 7, wherein the first cutting face encloses a first angle with a plane formed perpendicularly to the axial direction and the second cutting face encloses a second angle with said plane, wherein the value of the second angle is smaller than the value of the first angle, and wherein the second cutting face faces the recess.

9. The blind rivet element according to claim 1, wherein the head portion has a greater extent in the axial direction in the region of the first protrusion and/or in the region of the second protrusion than in adjacent regions of the head portion.

10. The blind rivet element according to claim 1, wherein both the at least one first protrusion and the at least one second protrusion are formed on the outer edge of the head portion.

11. The blind rivet element according to claim 1, wherein both the at least one first protrusion and the at least one second protrusion are formed by local deformation of a region of the head portion.

12. The blind rivet element according to claim 1, wherein all of the head portion, the shank, the at least one first protrusion and the at least one second protrusion are integrally formed.

13. The blind rivet element according to claim 1, wherein the shank has an internal thread.

14. The blind rivet element according to claim 1, wherein during use each of the plurality of first protrusions and the plurality of second protrusions are positioned and configured for extending into a component in which the blind rivet element is used.

15. A blind rivet element having a head portion and a shank adjacent to the head portion in an axial direction and extending in a shank-extending direction, wherein the shank has an internal thread or a connecting portion for a threaded bolt, and a deformation portion between the internal thread or the connecting portion for the threaded bolt and the head portion for forming a closing head when the deformation portion is deformed, wherein the head portion has a radially outer region formed spaced apart from the shank in a radial direction, wherein the head portion has at least one first protrusion formed exclusively in the radially outer region of the head portion, and wherein the head portion has at least one second protrusion formed exclusively in the radially outer region of the head portion, wherein the blind rivet element has a plurality of first protrusions protruding in a first direction that is parallel to the shank-extending direction and from a first side of the head portion and a plurality of second protrusions protruding in a second direction that is parallel to the shank-extending direction opposite the first direction and from a second side of the head portion opposite the first side, wherein the plurality of first protrusions and the plurality of second protrusions are formed on a respective side of the head portion in an encircling direction about an axis formed in the axial direction, and wherein the plurality of first protrusions and the plurality of second protrusions are formed in an alternating manner and separated by a recess on the respective side of the head portion in the encircling direction.

16. The blind rivet element according to claim 15, wherein during use each of the plurality of first protrusions and the plurality of second protrusions are positioned and configured for extending into a component in which the blind rivet element is used.

17. The blind rivet element according to claim 15, wherein both the at least one first protrusion and the at least one second protrusion are formed by local deformation of a region of the head portion.

18. The blind rivet element according to claim 15, wherein all of the head portion, the shank, the at least one first protrusion and the at least one second protrusion are integrally formed.

* * * * *